(12) United States Patent
Medower

(10) Patent No.: US 6,587,427 B1
(45) Date of Patent: Jul. 1, 2003

(54) MAGNETO-OPTICAL RECORDING MEDIUM

(75) Inventor: Brian Medower, San Jose, CA (US)

(73) Assignee: Terastor Corporation, San Jose, CA (US)

(*) Notice: Subject to any disclaimer, the term of this patent is extended or adjusted under 35 U.S.C. 154(b) by 0 days.

(21) Appl. No.: 09/088,530

(22) Filed: Jun. 1, 1998

(51) Int. Cl.[7] .............................. G11B 7/24; G11B 11/00
(52) U.S. Cl. .............................. 369/275.4; 369/13.35; 369/288; 428/64.1
(58) Field of Search ........................ 369/13, 275.3, 369/275.1, 275.4, 112.01, 118, 277, 44.23, 112.24, 126, 283, 288, 13.02, 13.35, 13.38, 13.39, 13.4; 428/64.3, 64.1, 694 DE, 694 XS, 694 NF, 64.2

(56) References Cited

U.S. PATENT DOCUMENTS

| 4,113,897 | A |   | 9/1978 | Nosker |
| 4,619,804 | A |   | 10/1986 | Leonard et al. |
| 4,841,515 | A |   | 6/1989 | James |
| 5,082,690 | A |   | 1/1992 | Miyake et al. |
| 5,498,507 | A | * | 3/1996 | Handa et al. ............. 430/273.1 |
| 5,614,287 | A | * | 3/1997 | Sekiya et al. |
| 5,654,058 | A | * | 8/1997 | Kirino et al. .............. 428/64.3 |
| 5,673,156 | A |   | 9/1997 | Chen et al. |
| 5,856,969 | A | * | 1/1999 | Nishiyama ............... 369/275.4 |
| 5,891,542 | A | * | 4/1999 | Tominaga et al. ......... 428/64.1 |
| 5,904,969 | A | * | 5/1999 | Kamezaki et al. ......... 428/64.1 |
| 6,243,350 | B1 | * | 6/2001 | Knight et al. ............... 369/126 |
| 6,264,848 | B1 | * | 7/2001 | Belser et al. ................. 216/22 |

* cited by examiner

Primary Examiner—Ali Neyzari
(74) Attorney, Agent, or Firm—Fish & Richardson P.C.

(57) ABSTRACT

A magneto-optical recording medium in a near-field optical storage system is provided. A flying optical head is suspended over the medium by a cushion of gas. The medium includes a magneto-optical recording layer including at least one recording track for magneto-optical recording of information. A tracking feature is associated with the recording track. An upper transparent dielectric layer is provided having an upper surface which is substantially planar over a recordable area of the medium above the recording track and the tracking feature. A reflector layer is positioned below the magneto-optical layer above a base substrate.

14 Claims, 2 Drawing Sheets (NOT TO SCALE)

(NOT TO SCALE)

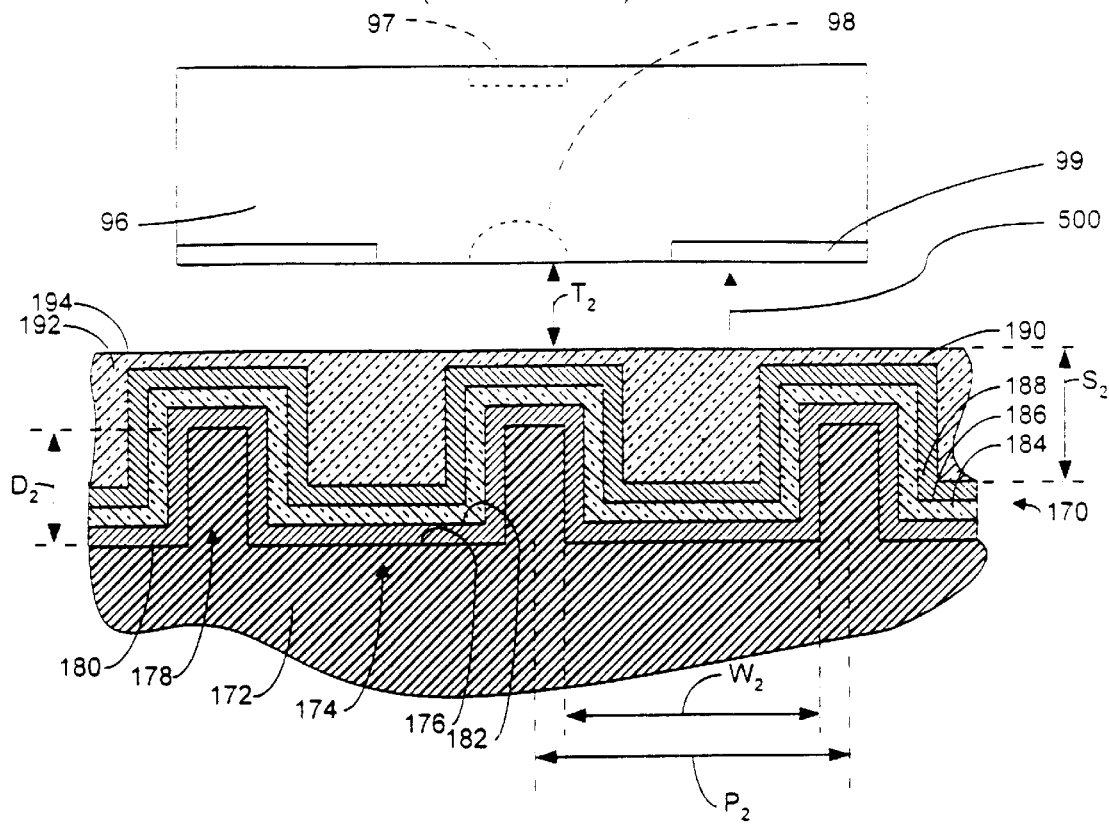
FIG. 3
(NOT TO SCALE)
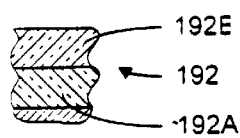
FIG. 4
(NOT TO SCALE)
FIG. 6
(NOT TO SCALE)
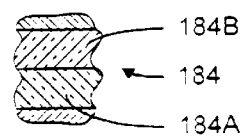
FIG. 5
(NOT TO SCALE)
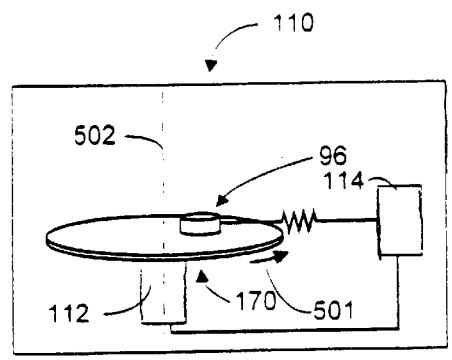

MAGNETO-OPTICAL RECORDING MEDIUM

TECHNICAL FIELD

This invention relates to optical data storage, and more particularly to recordable magneto-optical storage media for use in a near field system.

BACKGROUND

A variety of optical storage media and technologies exist. These include media which may not be recorded on by the user (often referred as read-only memory (ROM) as in CD-ROM). Also included are user recordable media (frequently designated as write-once-read-many WORM) and user re-recordable media. One area of user recordable and/or re-recordable media involves magneto-optical technology. A typical magneto-optical disk drive features a magnetic recording head and at least one laser. Bits of information are recorded in discrete locations ("domains") along the lengths of tracks spirally spanning the disk. In one form, the information is read via light from a read laser reflected by the disk. The nature of the reflected light is influenced by particles within the disk. To record a bit of information at a particular domain, a write laser may heat the domain to a condition wherein the magnetic head may apply a field to the domain to align the particles in that domain in a particular orientation corresponding to the state of the associated bit. Subsequently, with the particles frozen in the desired state, the read laser may be used to read the state of the bit.

FIG. 1 shows one conventional magneto-optical disk 20. The bulk of the disk 20 may be formed by a substrate 22 such as a polycarbonate disk. The flat upper surface 24 of the substrate 22 forms the upper surface of the disk. The surface 24 is in close facing proximity to the underside 28 of the head 30 as is described in further detail below. For reference, unless specified to the contrary, the "upward" direction 500 shall refer to the local direction from the media to the head when the head is in position to read or write data from or to the media. It is understood that the media and head may be placed in a variety of absolute orientations.

The lower surface 32 of the substrate may be formed with a series of alternating spiral grooved and ungrooved areas 34 and 36, respectively. A first dielectric layer 38 may be applied to the lower surface 32 of the substrate 22. A magneto-optical layer 40 may be applied to the lower surface 42 of the first dielectric layer. A second dielectric layer 44 may be applied to the lower surface 46 of the magneto-optical layer. A reflective layer 48 may be applied to the lower surface 50 of the dielectric layer. A protective layer 52 may be applied to the lower surface 54 of the reflective layer. The portions of the magneto-optical layer 40 below the grooved areas 34 define the tracks 56 on which bits of information may be recorded.

In operation, the disk 20 is rotated at high speed about its central axis (not shown). The magneto-optical head 60, which does not rotate with the disk, may be reciprocated approximately radially relative to the disk's central axis to access the various tracks on the disk.

A common head design for data storage systems is the "flying head". With a flying head, the relative motion between the disk and head caused by the rotation of the disk produces a flow of air between the head and the upper surface of the disk. The flow of air prevents the head from colliding with the disk and allows the head to maintain its close facing relationship with the upper surface of the disk. This is achieved by providing the lower surface of the head with appropriate air bearing surfaces 62.

The inconsistent spacing between the air bearing surfaces and the disk presents a number of difficulties. First, the stability of the head may be affected as the head moves across the disk. Second, the interaction of the head with the disk is harder to computationally model than with a uniformly flat upper disk surface. Such modeling is important if it is desired to economically alter the properties of the head, the geometry of the size and spacing of the tracks, or the rotational speed of the disk.

Accordingly, in one aspect, the invention is directed to a magneto-optical recording medium in a near-field optical storage system. A flying optical medium is suspended over the medium by a cushion of gas. The head includes a magneto-optical recording layer having at least one recording track for magneto-optical recording of information. At least one tracking feature is associated with the track. An upper transparent dielectric layer is provided with an upper surface which is substantially planar over a recordable area of the medium above the recording track and the tracking feature. A reflector layer is positioned below the magneto-optical layer above a base substrate. The upper dielectric layer has an upper surface which is substantially flat for presenting the flying optical head with a substantially uniform cushion of air between the upper surface of this dielectric layer and the air bearing surface of the flying optical head.

Implementations of the invention may include one or more of the following features. A lower transparent dielectric layer may be positioned below the magneto-optical recording layer and above the reflector layer. An upper surface of the recording track and the upper transparent dielectric layer may be separated by a distance between approximately 100 and 1 μm. The medium may be a disk. The reflector layer may be metallic.

The recording track and the tracking feature may each include annular features. The tracking feature may include a depression formed in an upper surface of at least one of: the substrate; the reflector layer; the lower transparent dielectric layer; and the magneto-optical recording layer. The depression may be formed by a groove in an upper surface of the substrate, the groove propagating the depression upward through the reflector layer, the lower transparent dielectric layer and the magneto-optical recording layer.

Either the upper or the lower dielectric layer may include a high index dielectric material, where the other of the layers includes a first sublayer of low index dielectric material and a second sublayer of high index dielectric material.

The high index dielectric material may be silicon nitride. The low index dielectric material may be silicon oxide. The magneto-optic layer may be made of a rare earth-transition metal compound including TbFeCo.

The groove has a groove width and a groove separation, a ratio of the groove width to groove separation may be less than about 7:15. The groove width may be less than about 0.175 μm.

In another aspect, the invention is directed to a near-field magneto-optical storage system. The system includes an optical head having an air-bearing surface, a laser for emitting a beam of light having a wavelength less than about 1 μm, a lens, a drive motor, and a magneto-optical storage disk.

The disk has an upper surface having a flat portion for interacting with the optical head via a substantially uniform cushion of air between the flat portion and the air bearing surface of the optical head. A magneto-optical recording layer is formed below the upper surface and includes at least one recording track for magneto-optical storage of information, which information is readable by the laser. The upper surface along the track is separated by a distance smaller than the wavelength from the lens. At least one tracking feature is associated with the recording track. A reflector layer is formed below the magneto-optical recording layer, below which is a substrate.

Implementations of the invention may include one or more of the following. An operational distance between the lens and the upper flat surface along the track is less than about 150nm.

In another aspect, the invention is directed to a medium in an optical storage system where a flying optical head is suspended over the medium by a cushion of gas. The medium includes a data layer having at least one track for storing information, at least one tracking feature associated with the at least one track, a dielectric layer having an upper surface substantially planar over a data area of the medium above the track and the tracking feature. The upper surface of the dielectric layer substantially forms an upper medium surface over the data area. A base substrate is provided below the data layer. The data layer may store read-only data or may store phase change media data.

Among the advantages made possible by the invention are improved dynamic coupling between the head and the exposed disk surface and improved tracking which may be balanced with a higher track density.

By presenting a substantially flat and smooth surface moving relative to the head, the aerodynamic properties of the layer of air trapped between the head become significantly uniform as the head moves radially. Furthermore, the aerodynamic properties become easier to model, both computationally and experimentally. This facilitates an easier process of designing heads and their associated actuation mechanisms. Additionally, changes may be made to the internal disk structure which would otherwise alter groove geometry without affecting the interaction between the disk and the head.

By reducing the portion of the disk between the groove and head occupied by air, the optical signal is increased. Additionally, because the dielectric layer filling the groove has a higher index of refraction than air, the optimal groove depth becomes smaller.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 3 is a partial schematic cross-sectional view of magneto-optical storage medium according to an embodiment of the invention.

FIG. 4 is a partial schematic cross-sectional view of an upper dielectric layer of a magneto-optical storage medium according to an embodiment of the invention.

FIG. 5 is a partial schematic cross-sectional view of a lower dielectric layer of a magneto-optical storage medium according to an embodiment of the invention.

FIG. 6 is a schematic view of a magneto-optical storage system according to an embodiment of the invention.

Like reference numbers and designations in the various drawings indicate like elements.

DETAILED DESCRIPTION

Figure 1:
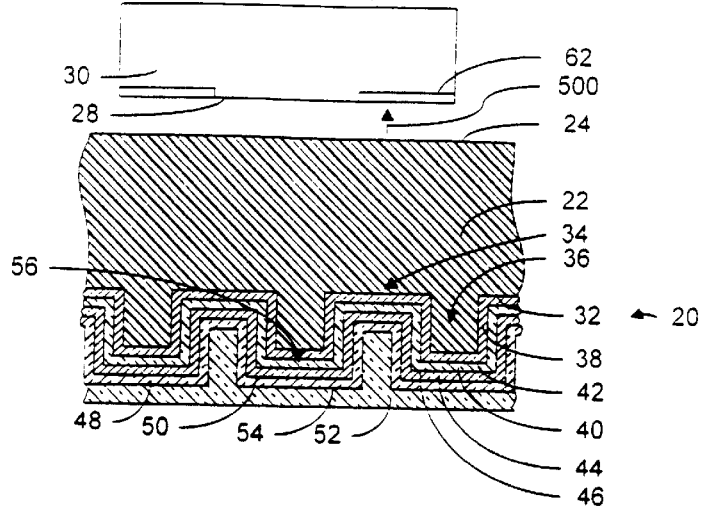
FIG. 1 is a partial schematic cross-sectional view of a prior art magneto-optical storage medium and head assembly.
Figure 2:
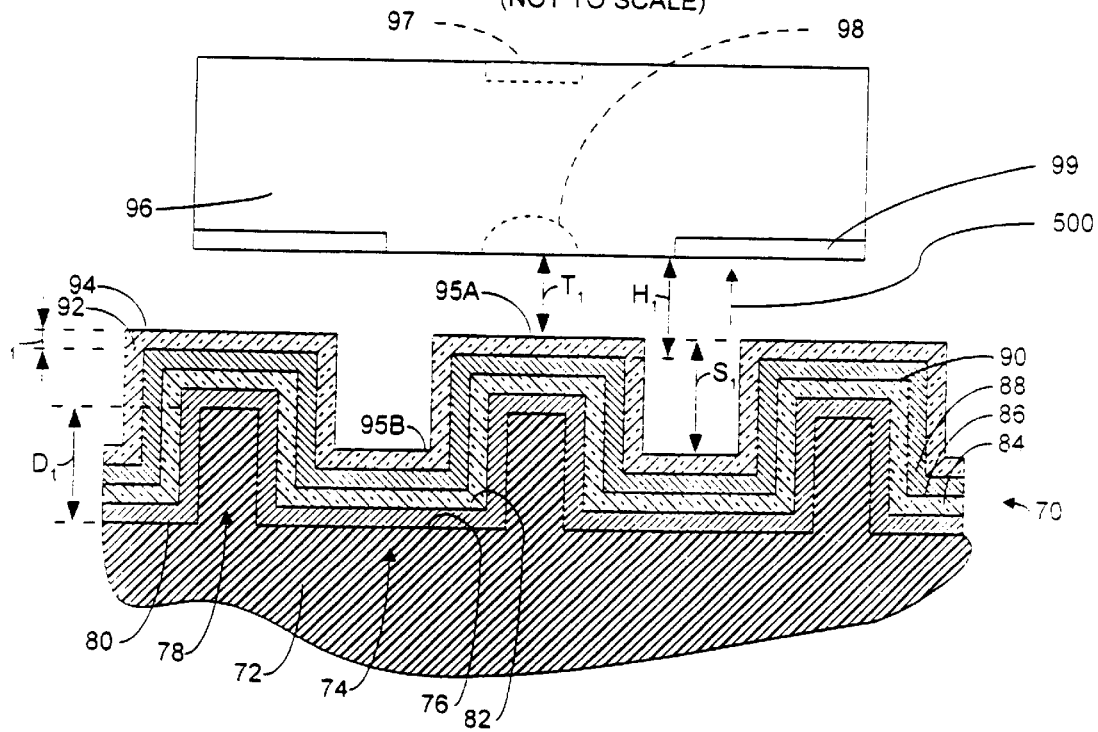
FIG. 2 is a partial schematic cross-sectional view of a magneto-optical storage medium.

Commonly assigned, copending U.S. patent application Ser. No. 08/846,916, filed Apr. 29, 1997, the disclosure of which is incorporated herein by reference, discloses a pioneering form of magneto-optical medium for first surface recording utilizing the near field effect. One such disk 70 is shown in FIG. 2. In the illustrated embodiment of the disk 70, a substrate 72 is at the bottom of a stack of layers. Spiral grooves 74 are formed in the upper surface 76 of the substrate. In the illustrated embodiment, the grooves are flat-bottomed channels, evenly radially spaced so as to define a flat-topped land 78 between each pair of adjacent grooves 74. A reflective layer 80 is formed atop the upper surface 76 of the substrate. The grooves 74 and lands 78 propagate through to the upper surface 82 of the reflective layer 80. A lower dielectric layer 84 is formed atop the reflective layer 80. The grooves and lands propagate through to the upper surface 86 of the lower dielectric layer. A magneto-optical layer 88 is formed atop the lower dielectric layer 84. The grooves and lands propagate through to the upper surface 90 of the magneto-optical layer 88. An upper dielectric layer 92 is formed atop the magneto-optical layer 88. The grooves and lands propagate through to the upper surface 94 of the upper dielectric layer 92. The upper surface 94 of the upper dielectric layer 92 forms the upper surface of the disk 70.

As shown in FIG. 2, the upper surface of the disk has a portion 95A above each land and a portion 95B above each groove. The portion 95A is at a height $S_1$ above the portion 95B. In operation, a head 96 is at a nominally fixed height above the disk. As the head moves radially over the disk, the spacing between a given point on the head and the portion of the disk immediately therebelow will vary by the height $S_1$. In the illustrated embodiment, the height $S_1$ is approximately the same as the land height $D_1$.

The head 96 carries a lens 98 and has air bearing surfaces 99. In the near-field regime, the spacing $T_1$ between the upper surface of the upper dielectric layer and the lens 98 is constrained to be less than $\lambda$. Exemplary values for these various parameters may be $\lambda$=685 nm, $T_1$=100 nm, $S_1$=70 nm, and $R_1$=50 nm.

FIG. 3 shows a disk 170 which may be generally similar to disk 70 of FIG. 2, with the key exception that the upper surface 194 of the upper dielectric layer 192 is substantially planar. Thus, grooves 174 formed in the upper surface 176 of the substrate 172 propagate through to the respective upper surfaces 182, 186 and 190 of the reflective layer 180, the lower dielectric layer 184 and the magneto-optical layer 188.

The effective optical path length for a light ray traveling from the lens 98 to a layer of the disk and back will be twice the sum of the products of the distance traveled through each layer (including the layer of air between the head and the upper surface of the disk) and the index of refraction of such layer. The present invention influences the effective optical path length from the head to the magneto-optical layer along the disk grooves. Using vertical distance as an approximation, with reference to FIG. 3, the effective optical path length along a groove is equal to 2 ($T_2 n_{air} + S_2 n_{dielectric}$). $T_2$ is the distance between the lens and the upper surface 194 of the dielectric layer and disk and $S_2$ is the height (thickness) of the upper dielectric layer 192 along a groove. For the disk of FIG. 2, the equivalent path length is 2 $(T_1 n_{air} + S_1 n_{air} + R_1 n_{dielectric})$. In this example $T_1$ is the height of the lens above the surface portion 95A and $S_1$ is the distance between the portion 95A and the upper surface 94 of the upper dielectric layer 92 along a groove. $R_1$ is the thickness of the upper dielectric layer (along both grooves and lands). In the exemplary embodiment, upper dielectric layers 92 and 192 may be formed of SiN, which has an index of refraction $n_{dielectric} \approx 2$. If it is desired that the effective path lengths be the same as each other, then $T_1 n_{air} + S_1 n_{air} + R_1 n_{dielectric} = T_2 n_{air} + S_2 n_{dielectric}$. If $T_2$ is identical to $T_1$, then $S_1 n_{air} + R_1 n_{dielectric} = S_2 n_{dielectric}$. Substituting $n_{dielectric} + 2$ and $n_{air} = 1$, $S_1 + 2R_1 = 2S_2$. Thus, $S_2 = \frac{1}{2}S_1 + R_1$. The groove depth $D_1$ in the embodiment in FIG. 2 is approximately $S_1$. In the embodiment of FIG. 3, if the height of the second dielectric layer 192 above the lands 178 is kept the same as the thickness $R_1$ of the second dielectric layer 92 of FIG. 2, the groove depth $D_2$ in the embodiment of FIG. 3 is approximately $S_2 - R_1$. Substituting for $S_2$, $D_2 + R_1 = \frac{1}{2}S_1 + R_1$. Canceling and substituting for $S_1$, $D_2 = \frac{1}{2}D_1$. Thus, it can be seen that in the embodiment of FIG. 3, the groove depth $D_2$ may be reduced significantly relative to the groove depth $D_1$ of the embodiment of FIG. 2. The reduction in groove depth facilitates a reduction in the groove width $W_2$ and in the pitch $P_2$ or distance between adjacent tracks. This in part arises as the shallower grooves may be formed more precisely than the deeper grooves causing less lateral distance to be lost in the transition between the flat bottom of the groove and the flat top of the adjacent lands.

In the exemplary embodiment, the substrate may be made of polycarbonate or a similarly lightweight and rigid material. The reflector layer may be made of aluminum. The magneto-optical layer may be made of a rare earth-transition metal compound including TbFeCo. The dielectric layers may be made of SiN.

In an alternate embodiment shown in FIG. 4, the second dielectric layer 192 may comprise a lower sublayer 192A and an upper sublayer 192B. In an exemplary embodiment, the lower sublayer 192A may comprise a low index dielectric material formed on the magneto-optical layer and the upper sublayer 192B may comprise a high index dielectric material. In an exemplary embodiment, the lower sublayer may comprise $SiO_2$ and the upper sublayer may be made of SiN. Various materials, compositions and dimensions for the various layers are described in the co-pending application identified above.

Similarly, as shown in FIG. 5, the first dielectric 184 may comprise lower sublayer 184A and an upper sublayer 184B. In an exemplary embodiment, the lower sublayer 184A may comprise a high index dielectric material formed on the reflector layer and the upper sublayer 184B may be made of a low index dielectric material. It should be noted that layer 184 may be omitted altogether if desired.

Preferred methods of applying a planarizing layer, e.g., the second dielectric layer in FIG. 4, include chemical vapor deposition (CVD), sputtering, and dipping or spin coating such as with a sol gel. In the illustrated embodiment, a preferred ratio of the groove width $W_2$ to the groove separation or pitch $P_2$ is less than about 7:15. In the illustrated embodiment, a preferred groove width $W_2$ is less than about 0.175 μm.

FIG. 6 shows a near field magneto-optical storage system 110 for use with the disk 170. The system may incorporate the head 96 and includes a drive motor 112. The disk 170 is carried within the system for rotation about its central axis 502 driven by the drive motor 112. The head 96 and drive motor 112 are coupled to a control system 114 which may include a microprocessor, programmed with appropriate control software.

A number of embodiments of the present invention have been described. Nevertheless, it will be understood that various modifications may be made without departing from the spirit and scope of the invention. For example, a variety of complex layerings and track structures are possible as are a variety of medium arrangements. The invention may be utilized in the context of read-only media and phase change media, besides the magneto-optic media described in the embodiments above. In these cases, a planarizing layer may be located at any point in the structure, not just at the topmost layer as described in the embodiments above. Accordingly, other embodiments are within the scope of the following claims.

What is claimed is:

1. A magneto-optical recording medium in a near-field optical storage system wherein a flying optical head is suspended over said medium by a cushion of gas, comprising:
   a magneto-optical recording layer including at least one recording track for magneto-optical recording of information;
   at least one tracking feature associated with the at least one recording track;
   an upper transparent dielectric layer atop the magneto-optical layer, the upper transparent dielectric layer leveling the at least one recording track and having an upper surface substantially planar over a recordable area of the medium above the at least one recording track and the at least one tracking feature, the upper surface of the upper transparent dielectric layer substantially forming an upper flat medium surface over said recordable area;
   a reflector layer below the magneto-optical layer;
   a base substrate below the reflector layer; and
   a lower transparent dielectric layer below the magneto-optical recording layer, wherein the reflector layer is below the lower transparent dielectric layer, wherein the lower dielectric layer comprises a high index dielectric material, and wherein the upper dielectric layer comprises a first sublayer of low index dielectric material and a second sublayer of high index dielectric material.

2. The medium of claim 1 wherein a thickness between an upper surface of the at least one recording track and the upper surface of the upper transparent dielectric layer is between approximately 100 and 1 μm.

3. The medium of claim 1 formed as a disk.

4. The medium of claim 3 wherein the at least one recording track and the at least one tracking feature each comprise annular features.

5. The medium of claim 1 wherein the at least one tracking feature each comprises a depression formed in an upper surface of at least one of: the substrate; the reflector layer; the lower transparent dielectric layer; and the magneto-optical recording layer.

6. The medium of claim 1 wherein the at least one tracking feature each comprises a depression formed in an upper surface of at least one of: the substrate; the reflector layer; and the magneto-optical recording layer.

7. The medium of claim 5 wherein the depression is formed by a groove in an upper surface of the substrate, the groove propagating the depression upward through the reflector layer, the lower transparent dielectric layer and the magneto-optical recording layer.

8. A magneto-optical recording medium in a near-field optical storage system wherein a flying optical head is suspended over said medium by a cushion of gas, comprising:
   a magneto-optical recording layer including at least one recording track for magneto-optical recording of information;
   at least one tracking feature associated with the at least one recording track;
   an upper transparent dielectric layer atop the magneto-optical layer, the upper transparent dielectric layer leveling the at least one recording track and having an upper surface substantially planar over a recordable area of the medium above the at least one recording track and the at least one tracking feature, the upper surface of the upper transparent dielectric layer substantially forming an upper flat medium surface over said recordable area;
   a reflector layer below the magneto-optical layer;
   a base substrate below the reflector layer; and
   a lower transparent dielectric layer below the magneto-optical recording layer, wherein the reflector layer is below the lower transparent dielectric layer, and wherein:
      the lower dielectric layer comprises a first sublayer of low index dielectric material and a second sublayer of high index dielectric material; and
      the upper dielectric layer comprises a high index dielectric material.

9. The medium of claim 1 wherein:
   the upper dielectric layer comprises a first sublayer of low index dielectric material and a second sublayer of high index dielectric material.

10. The medium of claim 1 wherein the reflector layer is metallic.

11. A magneto-optical recording medium in a near-field optical storage system wherein a flying optical head having an air-bearing surface is suspended over said medium, comprising:
   a base substrate having an upper surface having at least one groove;
   a reflector layer formed having a lower surface atop the upper surface of the base substrate, the reflector layer further having an upper surface having at least one depression above the at least one groove;
   a first dielectric layer formed having a lower surface atop the upper surface of the reflector layer, the first dielectric layer further having an upper surface having at least one depression above the at least one groove;
   a magneto-optical recording layer formed having a lower surface atop the upper surface of the first dielectric layer, the magneto-optical recording layer further having an upper surface having at least one depression above the at least one groove; and
   a second dielectric layer formed having a lower surface atop the upper surface of the magneto-optical recording layer for interfacing with the flying optical head and having an upper surface substantially flat for presenting the flying optical head with a substantially uniform cushion of air between the upper surface of the second dielectric layer and the air bearing surface of the flying optical head, wherein:
      said first dielectric layer comprises a high index dielectric material: and
      said second dielectric layer comprises a first sublayer of low index dielectric material and a second sublayer of high index dielectric material.

12. The medium of claim 11, wherein:
   the high index dielectric material of the second sublayer is silicon nitride;
   the low index dielectric material of the first sublayer is a silicon oxide; and
   the magneto-optic layer is made of a rare earth-transition metal compound including TbFeCo.

13. A magneto-optical recording medium in a near-field optical storage system wherein a flying optical head having an air-bearing surface is suspended over said medium, comprising:
   a base substrate having an upper surface having at least one groove;
   a reflector layer formed having a lower surface atop the upper surface of the base substrate, the reflector layer further having an upper surface having at least one depression above the at least one groove;
   a first dielectric layer formed having a lower surface atop the upper surface of the reflector layer, the first dielectric layer further having an upper surface having at least one depression above the at least one groove;
   a magneto-optical recording layer formed having a lower surface atop the upper surface of the first dielectric layer, the magneto-optical recording layer further having an upper surface having at least one depression above the at least one groove; and
   a second dielectric layer formed having a lower surface atop the upper surface of the magneto-optical recording layer for interfacing with the flying optical head and having an upper surface substantially flat for presenting the flying optical head with a substantially uniform cushion of air between the upper surface of the second dielectric layer and the air bearing surface of the flying optical head, wherein said at least one groove has a groove width and a groove separation, a ratio of the groove width to groove separation being less than about 7:15.

14. A magneto-optical recording medium in a near-field optical storage system wherein a flying optical head having an air-bearing surface is suspended over said medium, comprising:
   a base substrate having an upper surface having at least one groove;
   a reflector layer formed having a lower surface atop the upper surface of the base substrate, the reflector layer further having an upper surface having at least one depression above the at least one groove;
   a first dielectric layer formed having a lower surface atop the upper surface of the reflector layer, the first dielectric layer further having an upper surface having at least one depression above the at least one groove;
   a magneto-optical recording layer formed having a lower surface atop the upper surface of the first dielectric layer, the magneto-optical recording layer further having an upper surface having at least one depression above the at least one groove; and
   a second dielectric layer formed having a lower surface atop the upper surface of the magneto-optical recording layer for interfacing with the flying optical head and having an upper surface substantially flat for presenting the flying optical head with a substantially uniform cushion of air between the upper surface of the second dielectric layer and the air bearing surface of the flying optical head, wherein said at least one groove has a groove width being less than about 0175 $\mu$m.

* * * * *